United States Patent
Shibata et al.

(10) Patent No.: US 10,486,615 B1
(45) Date of Patent: Nov. 26, 2019

(54) STORAGE HOLDER

(71) Applicant: TOYODA GOSEI CO., LTD., Kiyosu-shi, Aichi-ken (JP)

(72) Inventors: Minoru Shibata, Kiyosu (JP); Yuhki Ichikawa, Kiyosu (JP); Akira Azumi, Kiyosu (JP); Kenji Asano, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/532,740

(22) Filed: Aug. 6, 2019

(30) Foreign Application Priority Data

Sep. 28, 2018 (JP) ................................. 2018-185585

(51) Int. Cl.
*H04M 1/00* (2006.01)
*B60R 11/02* (2006.01)
*B60R 11/00* (2006.01)

(52) U.S. Cl.
CPC ... *B60R 11/0241* (2013.01); *B60R 2011/0007* (2013.01); *B60R 2011/0071* (2013.01); *B60R 2011/0075* (2013.01)

(58) Field of Classification Search
CPC ......... B60R 11/0241; B60R 2011/0007; B60R 2011/0071; B60R 2011/0075; B60R 11/00; H02J 50/40; H02J 7/0021; H02J 7/0027; H02J 7/0044; H01R 43/00; B60N 3/102; Y02T 90/122; Y10T 29/49117; H04M 1/72572
USPC ....................................... 455/575.9; 320/108
See application file for complete search history.

(56) References Cited

U.S. PATENT DOCUMENTS

| | | | |
|---|---|---|---|
| 9,318,915 B2* | 4/2016 | Miller | H02J 50/00 |
| 9,326,587 B2* | 5/2016 | Gronewoller | A45F 5/021 |
| 9,723,390 B2* | 8/2017 | Shaffer | H04R 1/1025 |
| 2011/0009057 A1* | 1/2011 | Saunamaki | H02J 7/025 |
| | | | 455/41.1 |
| 2011/0156637 A1* | 6/2011 | Thorsell | B60N 3/002 |
| | | | 320/108 |

(Continued)

FOREIGN PATENT DOCUMENTS

| | | | |
|---|---|---|---|
| JP | 2009044872 A | * | 2/2009 |
| JP | 2015027224 A | * | 2/2015 |

(Continued)

*Primary Examiner* — Mahendra R Patel
(74) *Attorney, Agent, or Firm* — Posz Law Group, PLC

(57) ABSTRACT

Provided is a storage holder including: a case body having a peripheral wall portion forming a rectangular-parallelepiped-shaped storage space by two short-side side wall portions and two long-side side wall portions, a bottom wall portion closing a lower end of the storage space, and an opening for keeping an upper end of the storage space opened; a support mechanism that includes first and second support members which advance/retract and project into inside of the storage space through side wall openings formed in the short-side side wall portions, respectively, so as to oppose each other, and a support urging member for urging the support members into inside of the storage space; a power feeding coil disposed outside one long-side side wall portion; and a contact auxiliary unit for assisting in contacting the mobile device held in the storage space with an inner surface of the one long-side side wall portion.

9 Claims, 14 Drawing Sheets

(56) References Cited

U.S. PATENT DOCUMENTS

| | | | | |
|---|---|---|---|---|
| 2012/0062175 A1* | 3/2012 | Miller | .................... | H02J 50/40 |
| | | | | 320/108 |
| 2012/0149223 A1* | 6/2012 | Feldman | .......... | H01R 13/62933 |
| | | | | 439/157 |
| 2012/0315779 A1* | 12/2012 | Yudate | ................. | H01R 12/724 |
| | | | | 439/271 |
| 2013/0154555 A1* | 6/2013 | Miller | ................. | H02J 7/0042 |
| | | | | 320/108 |
| 2013/0221910 A1* | 8/2013 | Kim | ....................... | H02J 5/005 |
| | | | | 320/108 |
| 2018/0087572 A1* | 3/2018 | Chen | .................... | A47B 88/497 |

FOREIGN PATENT DOCUMENTS

| | | | | | |
|---|---|---|---|---|---|
| JP | 2016078585 A | * | 5/2016 | ............... | B60N 3/10 |
| JP | 2018-075875 A | | 5/2018 | | |
| JP | 2018075875 A | * | 5/2018 | | |
| KR | 20080036702 A | * | 4/2008 | ............ | H02J 7/0044 |
| KR | 20140060157 A | * | 5/2014 | | |
| WO | WO-2013058006 A1 | * | 4/2013 | | |
| WO | WO-2013170683 A1 | * | 11/2013 | | |
| WO | WO-2015075017 A1 | * | 5/2015 | | |

* cited by examiner

STORAGE HOLDER

TECHNICAL FIELD

The present invention relates to a storage holder for holding, for example, a mobile device such as a smartphone.

BACKGROUND ART

To date, a storage holder attached to, for example, a center console of a vehicle has been known (for example, JP2018-75875A). The storage holder disclosed in JP2018-75875A has a peripheral wall portion that defines a storage space in which a mobile device is held, a bottom wall portion for holding the mobile device held in the storage space, and an opening by which an upper end of the storage space is kept open. The storage holder horizontally holds the mobile device such that the display screen of the mobile device faces upward or downward. The mobile device that is horizontally held in the storage holder is charged by power being supplied from a non-contact type power feeder disposed at a lower portion.

SUMMARY OF INVENTION

Technical Problem

However, in a horizontally-positioning structure in which the mobile device is held by the storage holder such that the display screen is horizontally disposed as disclosed in JP2018-75875A, although the mobile device is stably held, an area occupied on the surface of a center console or the like by the storage holder is increased. Therefore, a region to be occupied by switches, a cup holder, and the like becomes narrow. In the above-described horizontally-positioning structure, since a mobile device is likely to slide and move on the upper surface of the storage holder, stable power supply from the power feeder to the mobile device is difficult.

The present invention has been made in view of such circumstances, and an object of the present invention is to provide a storage holder that stably holds a mobile device, and allows stable power supply to the mobile device to be assured while allowing space saving.

Solution to Problem

A first aspect of the present invention is directed to a storage holder that includes: a case body that includes a peripheral wall portion that forms a rectangular-parallelepiped-shaped storage space by two short-side side wall portions including short sides and two long-side side wall portions including long sides, a bottom wall portion that has a rectangular shape and closes a lower end of the storage space, and an opening formed in a rectangular shape for keeping an upper end of the storage space opened; a support mechanism that includes a first support member and a second support member, and a support urging member, the first support member and the second support member configured to advance and retract and to project into an inside of the storage space through first side wall openings formed in the two short-side side wall portions, respectively, so as to oppose each other, and the support urging member configured to urge the first support member and the second support member into the inside of the storage space; a power feeding coil configured to supply power in a non-contact manner to a mobile device held in the storage space, the power feeding coil being disposed outside the storage space at a first long-side side wall portion that is one of the two long-side side wall portions; and a contact auxiliary unit configured to assist in bringing the mobile device held in the storage space into contact with an inner surface of the first long-side side wall portion.

In this configuration, a mobile device in the storage space is held from both sides in the width direction by the support mechanism. Furthermore, the contact auxiliary unit allows the mobile device held in the storage space to contact with and along the inner surface of the first long-side side wall portion at which the power feeding coil is disposed, and also regulates movement of the mobile device in the storage space in the thickness direction. Therefore, a vertically-positioning structure in which a mobile device is vertically positioned and movement of the mobile device in the storage space in both the width direction and the thickness direction is regulated, is realized. Therefore, the storage holder saves a space, and stable holding of the mobile device is assured. Moreover, the mobile device is held in the storage space in contact with and along the inner surface of the first long-side side wall portion at which the power feeding coil is disposed. Accordingly, stable power supply from the power feeding coil to the mobile device is assured.

DESCRIPTION OF EMBODIMENTS

Figure 1:
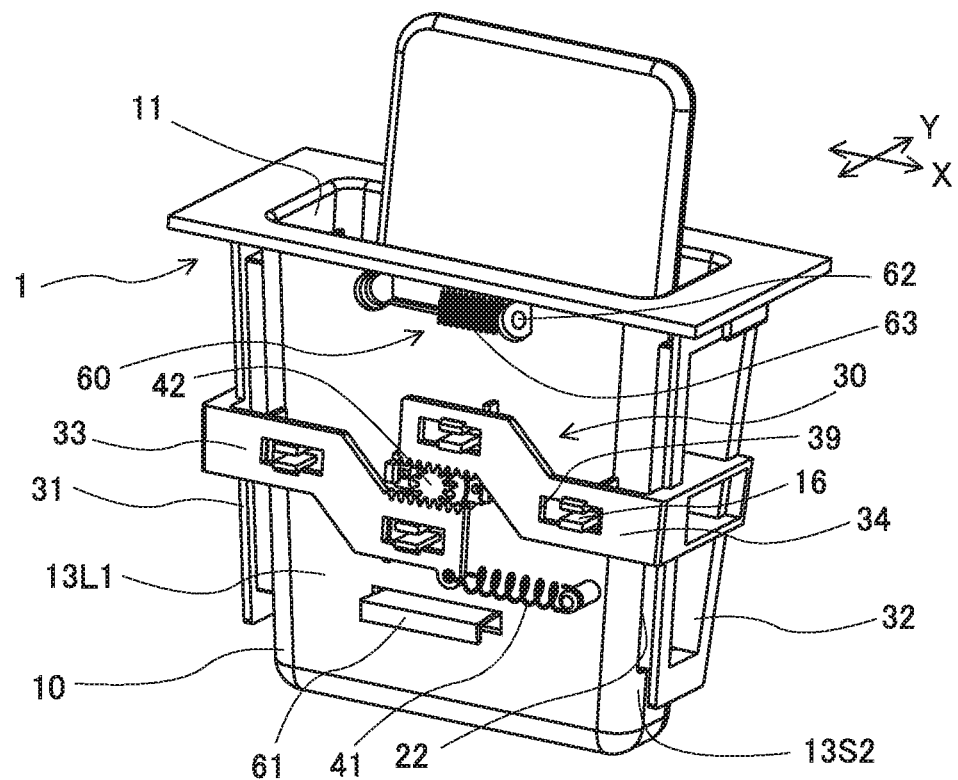
FIG. 1 is a perspective view of a front side of a storage holder (in a state where a smartphone is stored as an object to be stored) according to a first embodiment.
Figure 2:
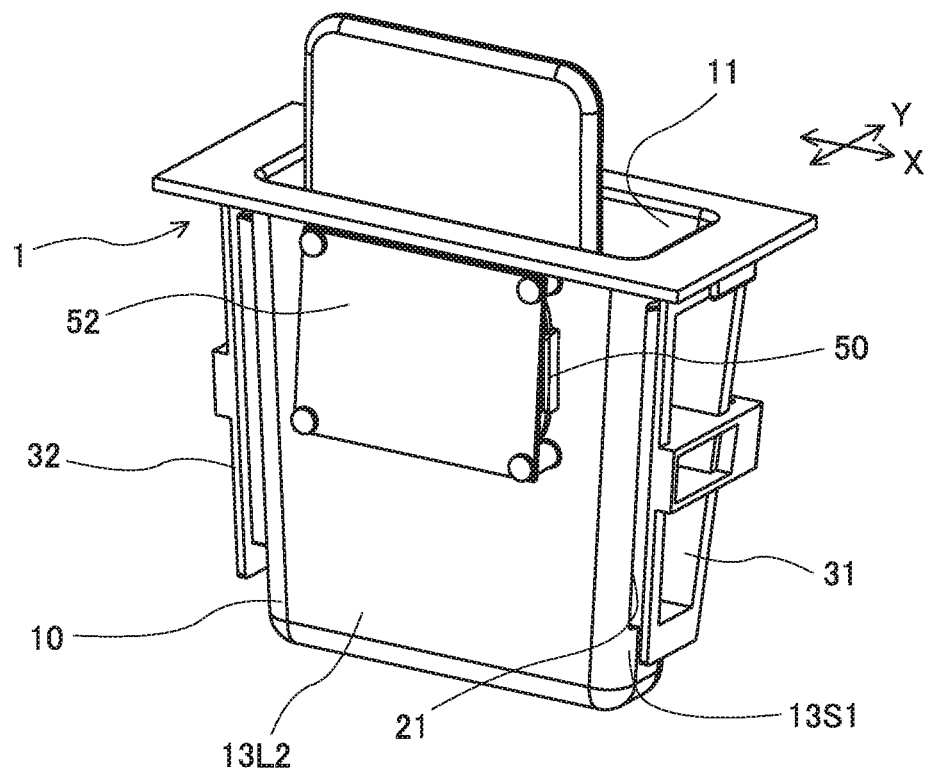
FIG. 2 is a perspective view of a rear side of the storage holder according to the first embodiment.
Figure 3:
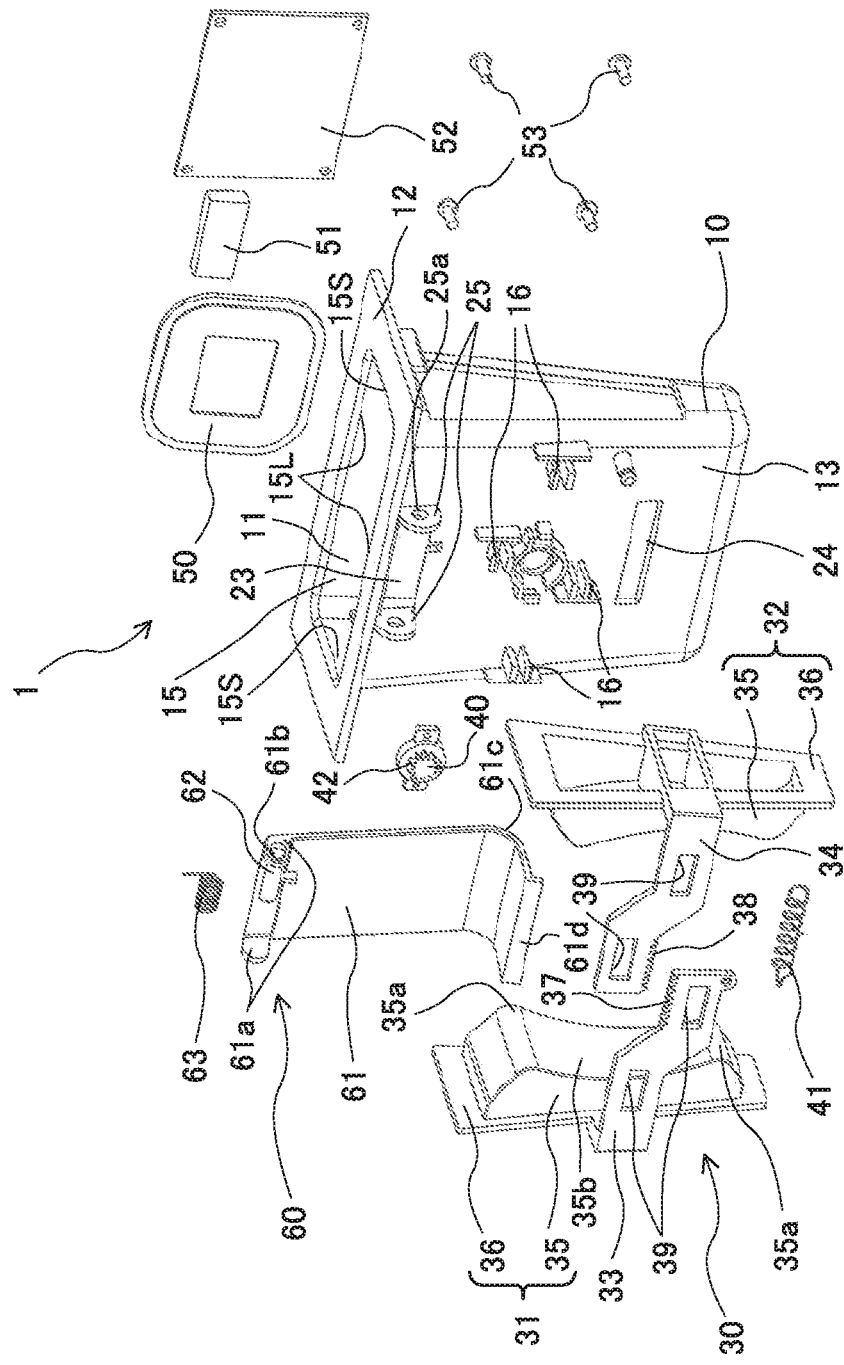
FIG. 3 is an exploded perspective view of the storage holder according to the first embodiment.
Figure 4:
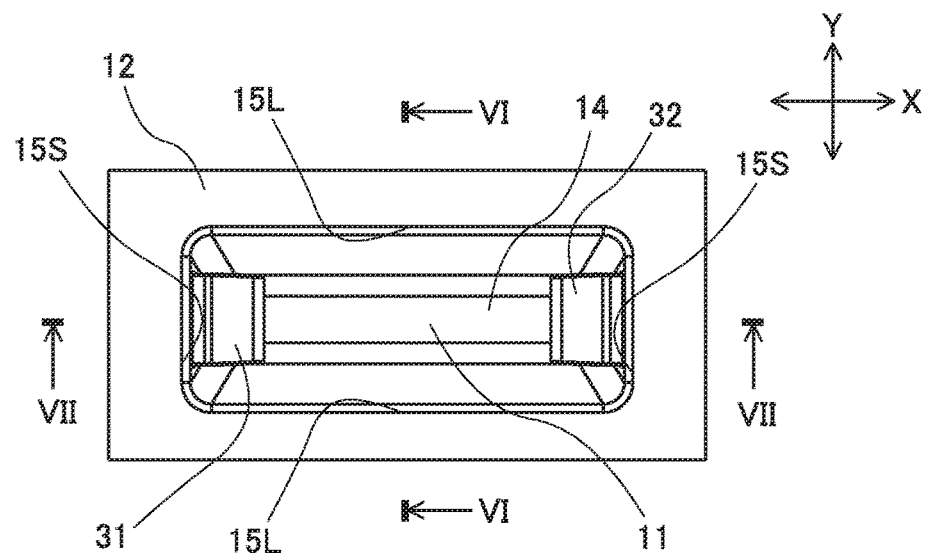
FIG. 4 is a top view of the storage holder according to the first embodiment.
Figure 5:
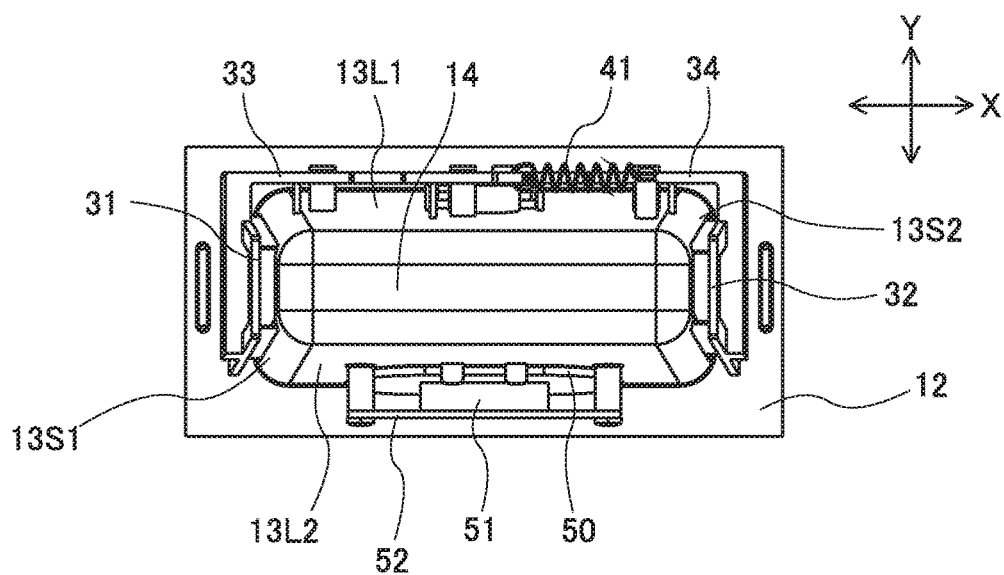
FIG. 5 is a bottom view of the storage holder according to the first embodiment.

Specific embodiments of a storage holder according to the present invention are described with reference to the drawings.

First Embodiment

A storage holder 1 according to a first embodiment is a holding device that mainly holds a rechargeable mobile device such as a smartphone and a mobile phone. The storage holder 1 is a holding device that has a vertically positioning structure for holding the mobile device such that the mobile device vertically extends. A mobile device to be held by the storage holder 1 is a device that has, for example, a thickness of 5 mm to 20 mm and a width of 60 mm to 90 mm. The storage holder 1 is attached to, for example, a center console in the interior of a vehicle. The storage holder 1 has a case body 10, a support mechanism 30, a power feeding coil 50, and a contact auxiliary unit 60, as shown in FIG. 1 to FIG. 7.

The case body 10 has a quadrangular-tube-like shape having a bottom. The case body 10 has a storage space 11. The storage space 11 is shaped in a rectangular parallelepiped in order to stably hold a mobile device. The case body 10 has an upper wall portion 12, a peripheral wall portion 13, a bottom wall portion 14, and an opening 15. The case body 10 is formed in a state where the upper wall portion 12, the peripheral wall portion 13, and the bottom wall portion 14 are integrated with each other. The storage space 11 of the case body 10 is formed by being surrounded by the peripheral wall portion 13 and the bottom wall portion 14, and is open upward through the opening 15.

The upper wall portion 12 is an upper panel portion that is formed as an upper surface of the storage holder 1. The upper wall portion 12 has a thin-plate-like shape, and is almost horizontally formed. The upper wall portion 12 is formed in an almost quadrangular shape. A rib necessary for attaching the storage holder 1 to a center console or the like is disposed on the back side surface of the upper wall portion 12.

The upper wall portion 12 has the opening 15. The opening 15 communicates with the storage space 11, and allows the upper end of the storage space 11 to open. The opening 15 is formed in a rectangular shape at almost the center of the upper wall portion 12. The opening 15 has two short sides 15S that extend parallel to each other, and two long sides 15L that extend parallel to each other in the direction orthogonal to the short sides 15S. A length of each short side 15S, that is, a distance between the two long sides 15L is, for example, 10 mm to 50 mm. A length of each long side 15L, that is, a distance between the two short sides 15S is, for example, 60 mm to 100 mm.

The peripheral wall portion 13 extends almost downward from the peripheral edge of the opening 15. The peripheral wall portion 13 has a height (specifically, a height from the bottom wall portion 14 to the opening 15) of, for example, 100 mm. The peripheral wall portion 13 has four side wall portions 13S1, 13S2, 13L1, and 13L2. The four side wall portions 13S1, 13S2, 13L1, and 13L2 are each formed in a flat-plate shape. The four side wall portions 13S1, 13S2, 13L1, and 13L2 form the rectangular-parallelepiped-shaped storage space 11.

The side wall portions 13S1, 13S2 are side walls that include the short sides 15S, respectively, of the opening 15. The side wall portion 13S1 and the side wall portion 13S2 oppose each other across the storage space 11 in a direction X orthogonal to the short sides 15S. The side wall portions 13L1, 13L2 are side walls that include the long sides 15L, respectively, of the opening 15. The side wall portion 13L1 and the side wall portion 13L2 oppose each other across the storage space 11 in a direction Y orthogonal to the long sides 15L. Hereinafter, the side wall portions 13S1, 13S2 are referred to as short-side side wall portions 13S1, 13S2, respectively, and the side wall portions 13L1, 13L2 are referred to as long-side side wall portions 13L1, 13L2, respectively.

Figure 6:
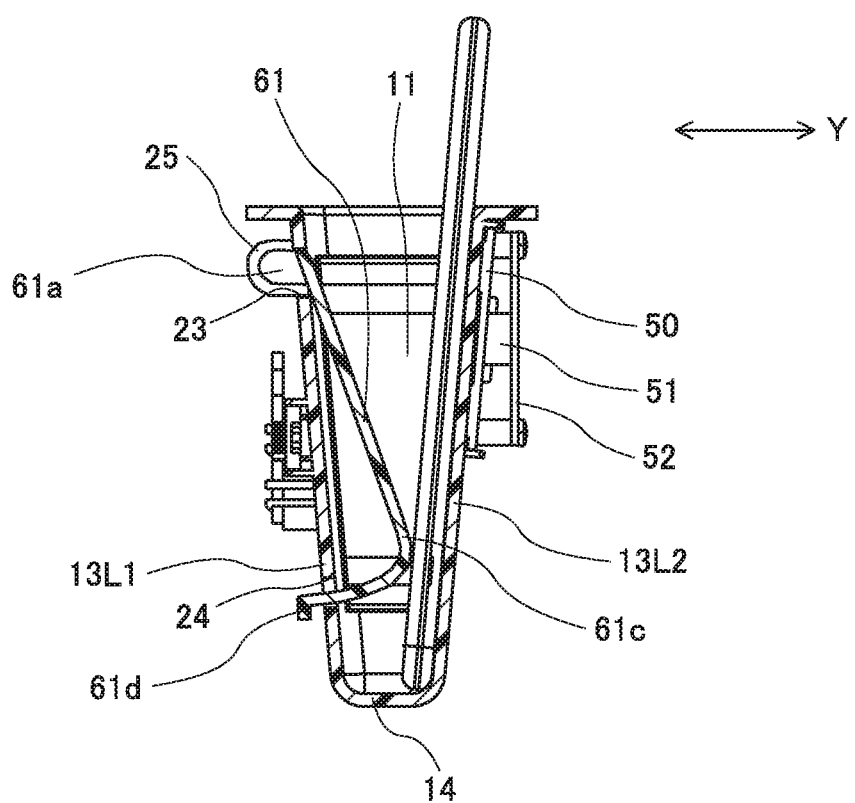
FIG. 6 is a cross-sectional view of the storage holder, as taken along a straight line VI-VI shown in FIG. 4, according to the first embodiment.

The bottom wall portion 14 extends from the lower end of the peripheral wall portion 13 in almost the horizontal direction. The bottom wall portion 14 closes the lower end of the storage space 11. The bottom wall portion 14 is formed in a rectangular shape. The bottom wall portion 14 is brought into contact with the bottom portion of a mobile device, and holds the mobile device. The area of the bottom wall portion 14 may be equal to the area of the opening 15 or may be smaller than the area of the opening 15. That is, the storage space 11 may have a trapezoidal cross-section such that, as shown in FIG. 6, each of the side wall portions 13S1, 13S2, 13L1, 13L2 is tilted to widen the opening 15 side portion and narrow the bottom wall portion 14 side portion.

The support mechanism 30 assists in holding a mobile device in the storage space 11 by holding the mobile device stored in the storage space 11 from both the sides in the width direction. The support mechanism 30 has a centering function for holding the mobile device at almost the center of the storage space 11 in the direction X. The support mechanism 30 has two support members 31, 32, two arm members 33, 34, a rotary body 40, and a support spring 41.

Figure 7:
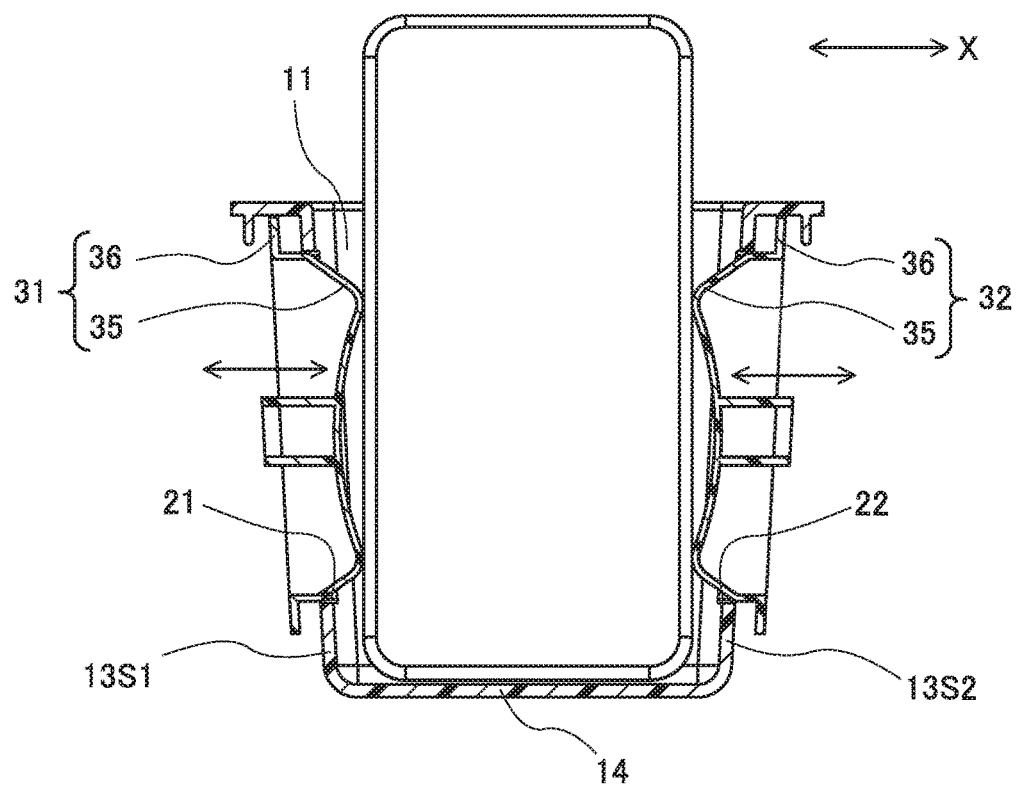
FIG. 7 is a cross-sectional view of the storage holder, as taken along a straight line VII-VII shown in FIG. 4, according to the first embodiment.
Figure 8:
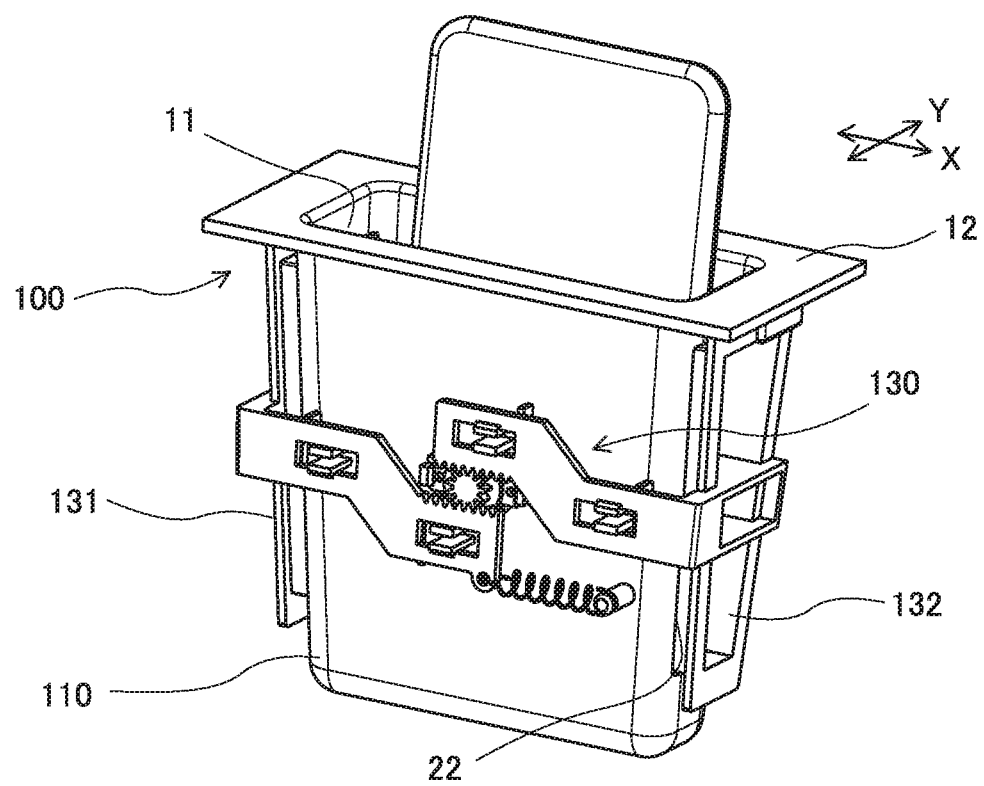
FIG. 8 is a perspective view of a front side of a storage holder according to a second embodiment.
Figure 9:
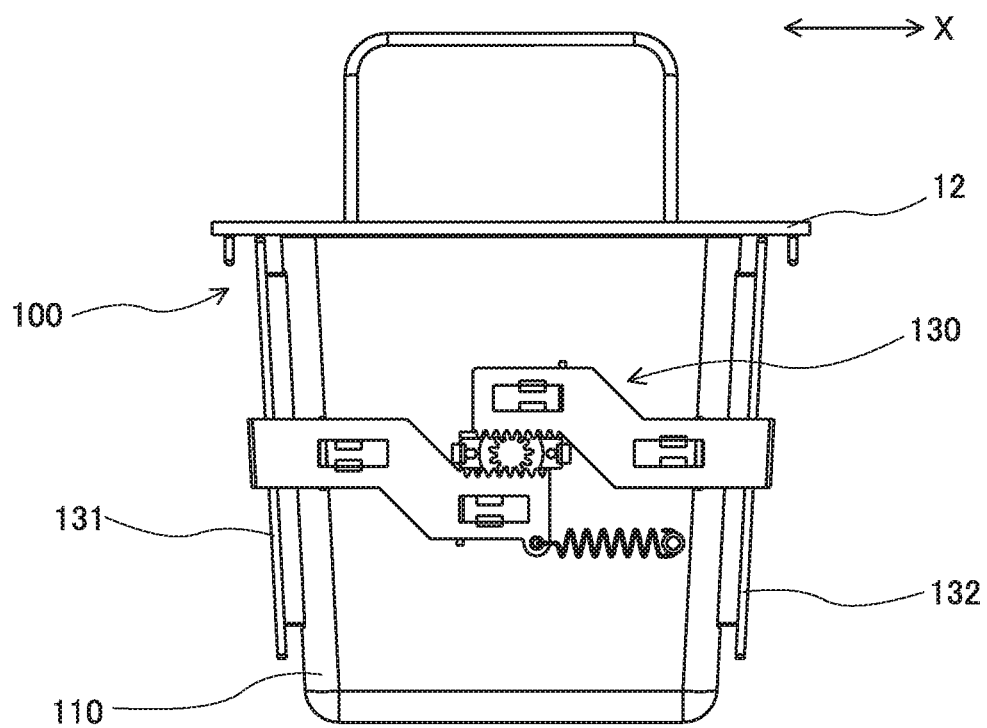
FIG. 9 is a front view of the storage holder according to the second embodiment.
Figure 10:
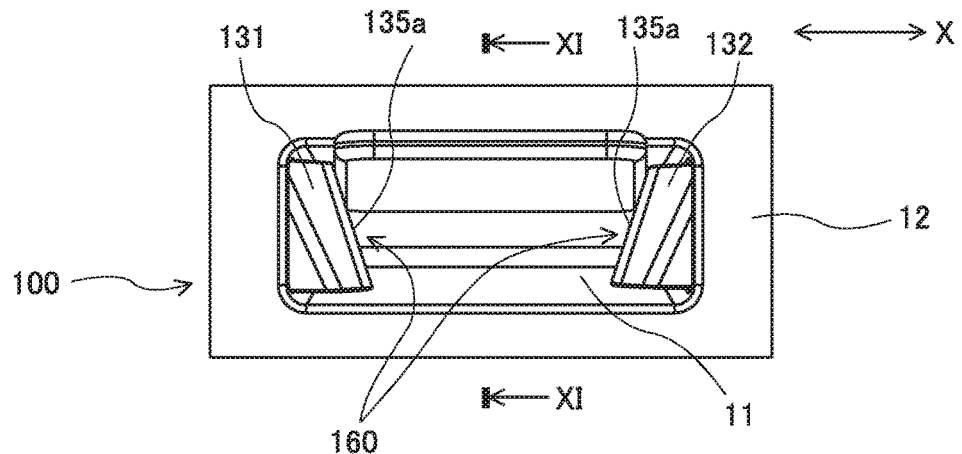
FIG. 10 is a top view of the storage holder according to the second embodiment.
Figure 11:
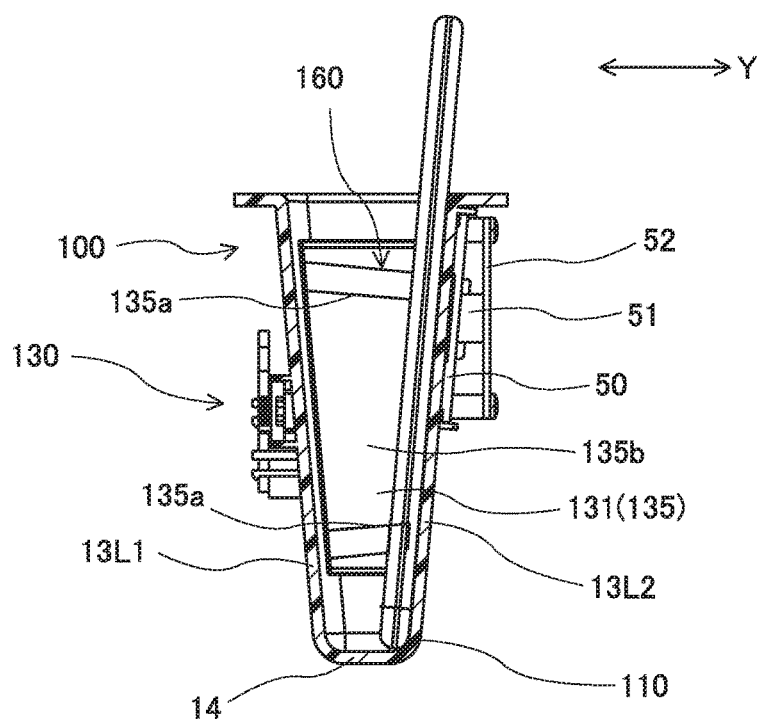
FIG. 11 is a cross-sectional view of the storage holder, as taken along a straight line XI-XI shown in FIG. 10, according to the second embodiment.

The support members 31, 32 advance and retract according to the width of a mobile device to be stored in the storage space 11. The support members 31, 32 are disposed so as to oppose each other across the storage space 11 as shown in FIG. 7. The short-side side wall portion 13S1 of the case body 10 has a short-side side wall opening 21. The short-side side wall opening 21 is formed so as to correspond to the size of the support member 31. The short-side side wall portion 13S2 of the case body 10 has a short-side side wall opening 22. The short-side side wall opening 22 is formed so as to correspond to the size of the support member 32.

The support member 31 is disposed in the short-side side wall opening 21, and advances into or retracts out of the storage space 11 through the short-side side wall opening 21 in the inner-outer direction of the storage space 11. The support member 32 is disposed in the short-side side wall opening 22, and advances into or retracts out of the storage space 11 through the short-side side wall opening 22 in the inner-outer direction of the storage space 11. That is, the support members 31, 32 advance and retract such that projection distances by which the support members 31, 32 project into the storage space 11 from the short-side side wall openings 21, 22 change. The support members 31, 32 advance or retract so as to be closer to or to separate from each other.

The support members 31, 32 each have a body portion 35 and a flange portion 36. The body portion 35 extends in the up-down direction, and has a U-shaped cross-section. The body portions 35 are disposed in the short-side side wall openings 21, 22 in a state where the cross-sectional bottom portions face toward the inside of the storage space 11 and the cross-sectional openings face toward the outside of the storage space 11. The body portions 35 have sizes less than the sizes of the short-side side wall openings 21, 22.

The body portions 35 have end faces 35b which face toward the storage space 11 in the advancing-retracting direction, and the end faces 35b face in the direction X in which the support members 31, 32 oppose each other. The end face 35b has an inward-projecting portion 35a that projects toward the inside of the storage space 11. The inward-projecting portion 35a is shaped such that a portion of the inward-projection portion 35a from the upper portion to the lower portion is diagonally tilted toward the inside of the storage space 11 to form a peak, and is then curved over the peak toward the outside of the storage space 11. The inward-projecting portion 35a contacts with the side surface, in the width direction, of the mobile device held in the storage space 11 to hold the mobile device. The inward-projecting portions 35a are disposed at two portions so as to be separate from each other in the up-down direction in order to assure stable holding of the mobile device, as shown in, for example, FIG. 3. In the structure in which the inward-projecting portions 35a are disposed at two portions in the body portion 35, positions of the projection ends of the inward-projecting portions 35a may be almost the same in the direction X.

The flange portion 36 is extended from the peripheral edge of the end portion of the body portion 35 on the side opposite to the storage space 11 side, so as to be flange-shaped. The flange portions 36 contact with the peripheral edge portions of the short-side side wall openings 21, 22 of the case body 10, and regulate the advancing of the support members 31, 32 when the support members 31, 32 have advanced to the innermost side of the storage space 11.

The arm members 33, 34 operate so as to link advancing and retracting of the support member 31 and advancing and retracting of the support member 32 with each other. The arm member 33 advances and retracts integrally with the support member 31. The arm member 33 has one end connected to the support member 31 and has the other end that extends toward the support member 32 in the direction X. The arm member 34 advances and retracts integrally with the support member 32. The arm member 34 has one end connected to the support member 32 and has the other end that extends toward the support member 31 in the direction X.

The height position at which the one end of the arm member 33 is connected to the support member 31, and the height position at which the one end of the arm member 34 is connected to the support member 32 is almost the same. Both the arm members 33, 34 extend in the direction X along the outer surface of the long-side side wall portion 13L1, outside the storage space 11, on the long-side side wall portion 13L1 which is one of the two long-side side wall portions 13L1, 13L2. The end portion of the arm member 33 and the end portion of the arm member 34 are bent so as to be displaced from each other in the up-down direction. For example, the end portion of the arm member 33 is disposed on the lower side, and the end portion of the arm member 34 is disposed on the upper side. The end portion of the arm member 33 and the end portion of the arm member 34 include portions that extend parallel to each other and overlap each other in the up-down direction.

The arm member 33 has a rack gear 37 at the end portion in the direction X. The arm member 34 has a rack gear 38 at the end portion in the direction X. The rack gears 37, 38 are formed on opposing faces at which the arm members 33, 34 overlap each other along the direction X. The rack gear 37 and the rack gear 38 oppose each other in the up-down direction. A gap is formed between the rack gear 37 and the rack gear 38.

The rotary body 40 is disposed between the arm member 33 and the arm member 34, that is, in the gap between the rack gear 37 and the rack gear 38. The rotary body 40 is rotatably supported at almost the center of the long-side side wall portion 13L1 of the case body 10. The rotary body 40 may have a damper function, for example, one-way clutch damper for reducing an advancing speed at which the support members 31, 32 are returned toward the inside of the storage space 11.

The rotary body 40 includes a pinion gear 42 that has projections and recesses formed on the outer side in the radial direction. The pinion gear 42 meshes with the rack gear 37 of the arm member 33 and the rack gear 38 of the arm member 34. The rotary body 40 rotates to slide the arm member 33 and the arm member 34 in conjunction with each other, to eventually advance and retract the support members 31 and 32 in a synchronous manner.

The arm members 33, 34 have engagement holes 39. The long-side side wall portion 13L1 has engagement projections 16. The engagement holes 39 and the engagement projections 16 engage with each other. The arm members 33, 34 are guided by engagement of the engagement holes 39 and the engagement projections 16 with each other when sliding relative to the case body 10. Thus, stable sliding of the arm members 33, 34 relative to the case body 10 is assured.

The support members 31, 32 each advance and retract between a predetermined projection position at which the flange portion 36 contacts with the case body 10 and the inward-projecting portion 35a thus projects into the storage space 11 to the innermost side, and a predetermined storage position at which the flange portion 36 is separated from the case body 10 toward the outside of the storage space 11 and the inward-projecting portion 35a is flush with the inner surface of the short-side side wall portion 13S1, 13S2 of the peripheral wall portion 13.

The support spring 41 is disposed between the case body 10 and the arm member 33, eventually between the case body 10 and the support member 31. The support spring 41 is disposed so as to extend in the direction X. The support spring 41 is an urging member which generates a spring force in the direction X. The support spring 41 has one end supported by and fixed to the end portion (specifically the end portion of the arm member 33) of the support member 31. The support spring 41 has the other end supported by and fixed to the case body 10. The support spring 41 generates an urging force for advancing the support member 31 toward the predetermined projection position, that is, toward the inside of the storage space 11.

When the support member 31 advances toward the inside of the storage space 11 by the urging force of the support spring 41, the support member 31 slides and advances integrally with the arm member 33 in the direction X in which the support member 31 approaches the other of the support members, that is, the support member 32. This sliding and advancing rotates (rotates leftward in FIG. 1) the rotary body 40, and the support member 32 slides and advances integrally with the arm member 34 in the direction X in which the support member 32 approaches the support member 31. Thus, both the support members 31, 32 advance in synchronization with each other by the urging force of the support spring 41.

In a normal state, by the urging force of the support spring 41 and meshing of the gear of the rotary body 40, the support member 31 is disposed at the predetermined projection position at which the inward-projecting portion 35a projects into the storage space 11 to the innermost side, and the support member 32 is disposed at the predetermined projection position at which the inward-projecting portion 35a projects into the storage space 11 to the innermost side. When, in this normal state, one of the support member 31 and the support member 32 is pressed in the direction X in which the support members 31 and 32 separate from each other, the pressed one of the support members 31, 32 slides and retracts integrally with a corresponding one of the arm members 33, 34 in the direction X in which both the support members 31, 32 separate from each other. The sliding and retracting rotates (rotates rightward in FIG. 1) the rotary body 40, and the other of the support members 32, 31 also slides and retracts integrally with the other of the arm members 34, 33 in the direction X in which both the support members 31, 32 separate from each other. Thus, both the support members 31, 32 retract in synchronization with each other by a pressing operation in the direction X for separating one of the support members 31, 32.

The power feeding coil 50 is a coil for feeding power to the mobile device held in the storage space 11 in a non-contact manner. The power feeding coil 50 is disposed outside the storage space 11 at the case body 10. Specifically, among the two long-side side wall portions 13L1, 13L2 of the peripheral wall portion 13, the power feeding coil 50 is disposed outside the storage space 11 at the long-side side wall portion 13L2 that opposes the long-side side wall portion 13L1 on which the arm members 33, 34 of the support mechanism 30 are disposed. The power feeding coil 50 is disposed through a buffer 51 on a printed board 52. The printed board 52 is mounted and fixed by screws 53 so as to extend along the outer surface of the long-side side wall portion 13L2. The power feeding coil 50 is disposed such that a magnetic flux flows in the direction orthogonal to the outer surface of the long-side side wall portion 13L2.

The contact auxiliary unit 60 assists in holding a mobile device in the storage space 11 by the mobile device stored in the storage space 11 being brought into contact with the inner surface of the long-side side wall portion 13L2 on which the power feeding coil 50 is disposed, among the two long-side side wall portions 13L1, 13L2 of the peripheral wall portion 13. The contact auxiliary unit 60 includes a pressing member 61, a shaft 62, and a press spring 63.

The pressing member 61 advances and retracts in the direction Y in which the long-side side wall portions 13L1, 13L2 oppose each other, and is thus brought into contact with the mobile device stored in the storage space 11, to press the mobile device toward the inner surface of the long-side side wall portion 13L2. The long-side side wall portion 13L1 of the case body 10 has long-side side wall openings 23, 24. The long-side side wall opening 23 is formed at the upper center of the long-side side wall portion 13L1. The long-side side wall opening 24 is formed at the lower center of the long-side side wall portion 13L1.

The long-side side wall opening 23 is formed so as to correspond to the size of the pressing member 61. Support wall portions 25 are disposed at outer edge portions on both end portions, in the direction X, of the long-side side wall opening 23 of the long-side side wall portion 13L1. Both the support wall portions 25 project toward the outside of the storage space 11 from the edge portions, respectively, of the long-side side wall opening 23 and are formed so as to have faces opposing each other. A through hole 25a is formed, at the center of each support wall portion 25, so as to be open in the horizontal direction (direction X). The pressing member 61 is disposed at the long-side side wall opening 23 and advances and retracts through the long-side side wall opening 23 toward the inside and the outside of the storage space 11.

The pressing member 61 is formed in a plate-like shape. Support wall portions 61a are disposed in the upper portion of the pressing member 61. The support wall portions 61a project toward the outside of the storage space 11 from the upper back surface of the pressing member 61. Each support wall portion 61a has, at the center thereof, a through hole 61b that is open in the horizontal direction (direction X). The shaft 62 extends horizontally. The shaft 62 is disposed so as to penetrate through the through holes 25a of the support wall portions 25 and the through holes 61b of the pressing member 61. The pressing member 61 oscillates (rotates) about the shaft 62.

The pressing member 61 is supported by the long-side side wall portion 13L1 of the case body 10 so as to oscillate by the shaft 62 being inserted into the through holes 61b in a state where the upper portion of the pressing member 61 is inserted in the long-side side wall opening 23 from the inside of the storage space 11 toward the outside of the storage space 11. A portion from the upper portion to the lower portion of the pressing member 61 projects from the long-side side wall opening 23 toward the inside of the storage space 11, and is disposed in the storage space 11. The pressing member 61 has, at the center portion in the up-down direction, a protrusion 61c positioned on the innermost side of the storage space 11. The protrusion 61c contacts with the mobile device held in the storage space 11.

The pressing member 61 is curved toward the outside of the storage space 11 from the protrusion 61c to the lower portion. The long-side side wall opening 24 of the long-side side wall portion 13L1 is formed so as to correspond to the size of the pressing member 61. The end portion of the lower portion of the pressing member 61 projects toward the outside of the storage space 11 from the long-side side wall opening 24, and is disposed outside the storage space 11. The pressing member 61 has, at the lower end, a stopper portion 61d that is curved downward. The stopper portion 61d contacts with the lower back face of the long-side side wall portion 13L1 below the long-side side wall opening 24 and thus regulates oscillating of the lower end of the pressing member 61 to the inside of the storage space 11, when the pressing member 61 oscillates toward the inside of the storage space 11.

The pressing member 61 advances and retracts between a predetermined contact position at which the end of the protrusion 61c touches and contacts with the inner surface of the long-side side wall portion 13L2, and a predetermined separate position at which the end of the protrusion 61c is disposed so as to be closest to the long-side side wall portion 13L1 in the storage space 11.

The press spring 63 is disposed between the pressing member 61 and the case body 10. The press spring 63 is disposed around the shaft 62. The press spring 63 has one end supported and fixed at the upper portion of the pressing member 61. The press spring 63 has the other end supported by and fixed to the case body 10. The press spring 63 generates an urging force for oscillating the pressing member 61 in the direction in which the center portion and the lower portion of the pressing member 61 in the up-down direction approach the inner surface of the long-side side wall portion 13L2, that is, an urging force for bringing the protrusion 61c of the pressing member 61 into contact with the inner surface of the long-side side wall portion 13L2, i.e., for urging the protrusion 61c to the predetermined contact position.

Next, an operation of the storage holder 1 is described.

When the storage holder 1 is in a normal state in which nothing is stored in the storage space 11, the support members 31, 32 have advanced, by an urging force of the support spring 41, to the predetermined projection position at which each inward-projecting portion 35a projects into the storage space 11 to the innermost side, and the pressing member 61 has oscillated, by an urging force of the press spring 63, to the predetermined contact position at which the protrusion 61c contacts with the inner surface of the long-side side wall portion 13L2.

When a mobile device is to be held by the storage holder 1, a person in the vehicle or the like inserts the mobile device into the storage space 11 in the vertical direction in which the thickness direction of the mobile device is aligned with the horizontal direction. When the mobile device to be held is inserted in the storage space 11 in the normal state, the bottom portion of the mobile device contacts with the tilted surfaces of the inward-projecting portions 35a of the two support members 31, 32 that oppose each other across the center of the storage space 11. After the contact, downward insertion of the mobile device progresses. According to the progress of the insertion, the support members 31, 32 are pressed, against the urging force of the support spring 41, in the direction X in which the support members 31 and 32 separate from each other, and slide and retract. Then, the side surfaces of the mobile device in the width direction contact with the end surfaces of the inward-projecting portions 35a, and the mobile device is held between the two support members 31 and 32, to stop the sliding and retracting. In this case, the mobile device is held by and between the two support members 31, 32 by the urging force of the support spring 41. Thereafter, the insertion of the mobile device progresses in a state where the mobile device is held by and between the two support members 31, 32 and the support members 31, 32 are maintained so as to retract from the predetermined projection positions.

When the mobile device has been inserted into the storage space 11, the mobile device is further inserted between the protrusion 61c of the pressing member 61 and the inner surface of the long-side side wall portion 13L2 which contacts with the protrusion 61c. In this case, of the two end faces of the mobile device in the thickness direction, the end face opposing the long-side side wall portion 13L1 contacts with the protrusion 61c of the pressing member 61. When the mobile device is inserted between the protrusion 61c of the pressing member 61 and the inner surface of the long-side side wall portion 13L2, the pressing member 61 oscillates so as to separate from the inner surface of the long-side side wall portion 13L2 against the urging force of the press spring 63. In this case, the mobile device is urged by the urging force of the press spring 63 through the pressing member 61 toward the inner surface of the long-side side wall portion 13L2. When the mobile device inserted in the storage space 11 is urged by the urging force of the press spring 63 toward the inner surface of the long-side side wall portion 13L2, the mobile device is pressed such that the end face opposing the long-side side wall portion 13L2 is brought into contact with and along the inner surface of the long-side side wall portion 13L2.

When the bottom portion of the mobile device contacts with the inner surface of the bottom wall portion 14 of the storage holder 1, the bottom wall portion 14 holds the mobile device in a state where the two support members 31, 32 hold the mobile device therebetween and the pressing member 61 causes the mobile device to contact with and along the inner surface of the long-side side wall portion 13L2. Thus, the mobile device is held in the storage space 11 of the storage holder 1.

In the state where the mobile device is held in the storage space 11 of the storage holder 1, the two support members 31, 32 of the storage holder 1 hold the mobile device therebetween by the urging force of the support spring 41. Therefore, the support mechanism 30 regulates movement of the mobile device held in the storage space 11 in the width direction in the storage space 11.

Both the two support members 31, 32 advance and retract according to the width of the mobile device. For example, for a mobile device having a relatively small width, each of the support members 31, 32 is positioned at an advancement/retraction position close to the predetermined projection position. Meanwhile, for a mobile device having a relatively large width, each of the support members 31, 32 is positioned at an advancement/retraction position close to the predetermined storage position. Therefore, the advancement/retraction position of each support member 31, 32 is changed between the predetermined projection position and the predetermined storage position according to the width of the mobile device to be held in the storage space 11. Therefore, a plurality of kinds of mobile devices having different width dimensions are appropriately held in the storage space 11 according to each mobile device. Furthermore, the two support members 31, 32 advance and retract in conjunction with each other. Therefore, a position at which the mobile device is held in the storage space 11 is maintained at the center of the storage space 11 in the direction X.

In the state where the mobile device is held in the storage space 11 of the storage holder 1, the pressing member 61 of the storage holder 1 presses the mobile device such that the mobile device is held between the inner surface of the long-side side wall portion 13L2 and the pressing member 61, and the mobile device is brought into contact with and along the inner surface of the long-side side wall portion 13L2. Therefore, the contact auxiliary unit 60 allows the mobile device held in the storage space 11 to contact with the inner surface of the long-side side wall portion 13L2 of the case body 10, and regulates movement of the mobile device held in the storage space 11 in the thickness direction in the storage space 11, by the mobile device being maintained in the storage space 11 in the contact state.

Thus, the storage holder 1 allows achievement of the vertically positioning structure in which the mobile device is held so as to extend in the vertical direction, that is, so as to align the display screen along the direction orthogonal to the horizontal direction. The vertically positioning structure of the storage holder 1 allows reduction of a region occupied by the storage holder 1 on the surface of a center console or the like to which the storage holder 1 is attached, and allows space saving, as compared to a horizontally positioning structure in which the display screen of the mobile device is horizontally positioned.

The storage holder 1 regulates movement of the mobile device held in the storage space 11 in both the width direction and the thickness direction (that is, horizontal direction) in the storage space 11. Therefore, even in the vertically positioning structure, the mobile device is inhibited from rattling in the storage space 11, and the mobile device is stably held. For example, damage to the display screen of the mobile device due to the rattling is prevented.

The mobile device contacts with the inner surface of the long-side side wall portion 13L2 in the case body 10 when the mobile device is held in the storage space 11. The power feeding coil 50 for supplying power to the mobile device in a non-contact manner is disposed outside the storage space 11 at the long-side side wall portion 13L2. Therefore, the storage holder 1 holds the mobile device in the storage space 11 in a state where the mobile device contacts with the inner surface of the long-side side wall portion 13L2 at which the power feeding coil 50 is disposed so as to be close to the power feeding coil 50, so that power is efficiently supplied to the mobile device in the storage space 11 from the power feeding coil 50.

Accordingly, the storage holder 1 according to the present embodiment allows space saving, allows the mobile device to be stably held, and allows stable power supply to the mobile device to be assured.

In the first embodiment, the short-side side wall openings 21, 22 correspond to "first side wall opening" recited in claims, the support members 31, 32 correspond to "first support member" and "second support member" recited in claims, the support spring 41 corresponds to "support urging member" recited in claims, and the long-side side wall portion 13L2 corresponds to "first long-side side wall portion" recited in claims.

In the first embodiment, the long-side side wall portion 13L1 corresponds to "second long-side side wall portion" recited in claims, the arm members 33, 34 correspond to "first arm portion" and "second arm portion" recited in claims, the rack gears 37, 38 correspond to "first rack gear" and "second rack gear" recited in claims, and the press spring 63 corresponds to "press urging member" recited in claims.

In the first embodiment, the support mechanism 30 is structured such that rotation of the rotary body 40 advances and retracts the support members 31, 32 in a synchronous manner. However, the present invention is not limited thereto. The support mechanism 30 may be structured such that the support spring for generating an urging force by which the support members 31, 32 advance and retract is provided for each of the support members 31, 32 so as to advance and retract the support members 31, 32 independently of each other.

Second Embodiment

In the storage holder 1 according to the first embodiment, the contact auxiliary unit 60 includes the pressing member 61 and the press spring 63, and the mobile device which is held in the storage space 11 by an urging force of the press spring 63 through the pressing member 61 is urged so as to contact with and along the inner surface of the long-side side wall portion 13L2 at which the power feeding coil 50 is disposed.

Meanwhile, a storage holder 100 according to a second embodiment is structured to have a contact auxiliary unit in which a predetermined portion of a support member of a support mechanism is tilted. The storage holder 100 includes a case body 110, a support mechanism 130, and a contact auxiliary unit 160 as shown in FIG. 8 to FIG. 11. In the storage holder 100 according to the second embodiment, the same components as those in the storage holder 1 according to the first embodiment are denoted by the same reference numerals, and the description thereof is omitted or simplified.

The case body 110 has a quadrangular tube-like shape having a bottom, similarly to the case body 10 according to the first embodiment. The case body 110 has the short-side side wall openings 21, 22. However, unlike the case body 10, the case body 110 does not have the long-side side wall openings 23, 24. Furthermore, the contact auxiliary unit 160 does not have the pressing member 61, the shaft 62, and the press spring 63, unlike the contact auxiliary unit 60 according to the first embodiment.

The support mechanism 130 assists in holding a mobile device in the storage space 11 by holding the mobile device stored in the storage space 11 from both the sides in the width direction. The support mechanism 130 has two support members 131, 132. The support members 131, 132 have the same function as the support members 31, 32 according to the first embodiment. The support members 131, 132 each have a body portion 135. An end face 135b of the body portion 135 in the advancing-retracting direction faces toward the storage space 11 and has an inward projecting portion 135a that projects toward the inside of the storage space 11.

The end face 135b of the body portion 135 faces in a direction different from the direction X in which the support members 131, 132 oppose each other, unlike the end face 35b of the body portion 35 according to the first embodiment. Specifically, the end face 135b is tilted such that a distance between one of the support members 131, 132 and the other of the support members 132, 131 other than the one of the support members 131, 132 increases toward the long-side side wall portion 13L2. That is, the support members 131, 132 are formed such that the end faces 135b of the body portions 135 form a shape obtained by truncating an inverted V, as viewed from thereabove. The contact auxiliary unit 160 has a tilt structure in which the end faces 135b of the support members 131, 132 are tilted.

In the storage holder 100, when the mobile device is inserted in the storage space 11, the support members 131, 132 are pressed in the direction X in which, at the inward projecting portions 135a, the support members 131 and 132 separate from each other by the mobile device, and slide and retract in a synchronous manner, thereby holding the mobile device from both the sides by an urging force of the support spring 41. Furthermore, the end faces 135b of the support members 131, 132 are tilted such that the distance between the support members 131 and 132 increases toward the long-side side wall portion 13L2 at which the power feeding coil 50 is disposed, as described above. Therefore, when the support members 131, 132 hold the mobile device therebetween, an urging force of the support spring 41 acts on the mobile device, and the mobile device receives forces from the directions orthogonal to the end faces 135b, from the end faces 135b of the support members 131, 132, and is urged toward the long-side side wall portion 13L2 at which the distance between the support members 131 and 132 is greater. In this case, the mobile device is pressed such that the end surface that opposes the long-side side wall portion 13L2 contacts with and along the inner surface of the long-side side wall portion 13L2.

Therefore, the storage holder 100 also allows the same effect as that of the storage holder 1 to be obtained. Furthermore, the storage holder 100 has a structure in which the end faces 135b of the support members 131, 132 are tilted such that the distance between the support members 131 and 132 increases toward the long-side side wall portion 13L2, and allows the structure to function as the contact auxiliary unit 160. Therefore, the pressing member 61, the shaft 62, the press spring 63, and the like of the contact auxiliary unit 60 of the storage holder 1 need not be provided, and the long-side side wall openings 23, 24 need not be formed in the case body 10. Accordingly, the storage holder 100 allows a mobile device in the storage space 11 to be held in contact with and along the inner surface of the long-side side wall portion 13L2 at which the power feeding coil 50 is disposed, with a small number of components in a simple structure, and, thus, the storage holder 100 further saves a space.

In the second embodiment, the tilt structure in which the end faces 135b of the support members 131, 132 are tilted corresponds to "second tilt structure" recited in claims.

In the second embodiment, both the end faces 135b of the support members 131, 132 are tilted such that the distance between the support members 131 and 132 increases toward the long-side side wall portion 13L2. However, the present invention is not limited thereto. At least one of the end faces 135b of the support members 131, 132 may be tilted such that a distance between the support members 131 and 132 increases toward the long-side side wall portion 13L2.

Third Embodiment

Figure 12:
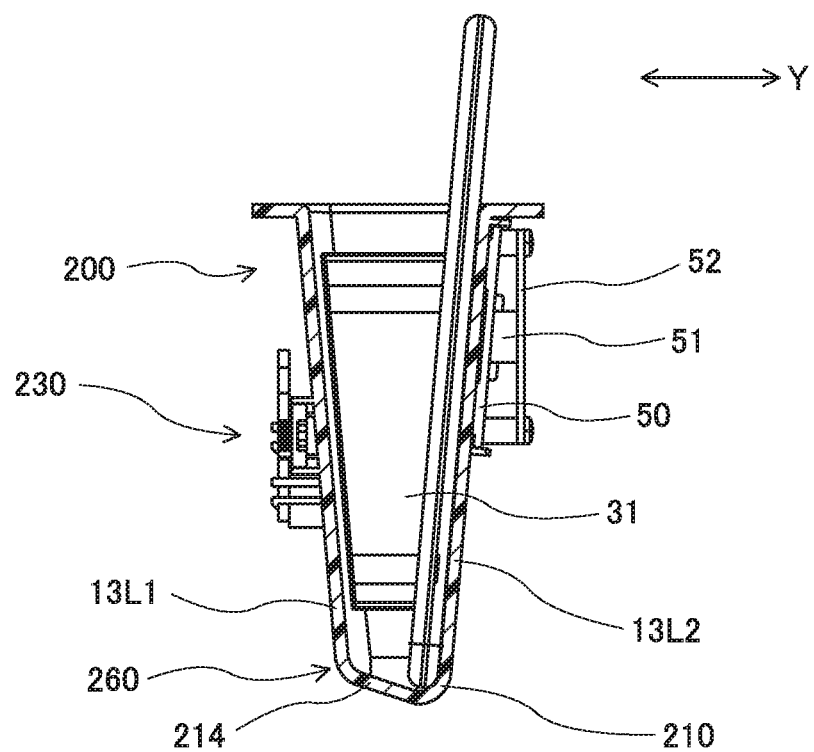
FIG. 12 is a cross-sectional view of a main portion of a storage holder according to a third embodiment.

The storage holder 100 according to the second embodiment has, as the contact auxiliary unit, a structure in which a predetermined portion of the support member of the support mechanism is tilted. Meanwhile, a storage holder 200 according to a third embodiment is structured to have a contact auxiliary unit in which a predetermined portion of a case body is tilted. The storage holder 200 includes a case body 210 and a contact auxiliary unit 260 as shown in FIG. 12. In the storage holder 200 according to the third embodiment, the same components as those in the storage holder 1 according to the first embodiment are denoted by the same reference numerals, and the description thereof is omitted or simplified.

The case body 210 has a quadrangular tube-like shape having a bottom, similarly to the case body 10 according to the first embodiment. The case body 210 has the short-side side wall openings 21, 22. However, unlike the case body 10, the case body 210 does not have the long-side side wall openings 23, 24. Furthermore, the contact auxiliary unit 260 does not have the pressing member 61, the shaft 62, and the press spring 63, unlike the contact auxiliary unit 60 according to the first embodiment.

The case body 210 has a bottom wall portion 214. The bottom wall portion 214 has a rectangular shape and closes the lower end of the storage space 11. However, the bottom wall portion 214 extends so as to be tilted relative to the horizontal direction, unlike the bottom wall portion 14. Specifically, the bottom wall portion 214 is tilted such that the position of the inner surface of the bottom wall portion 214 is lowered toward the long-side side wall portion 13L2. The contact auxiliary unit 260 has a tilt structure in which the bottom wall portion 214 of the case body 210 is tilted.

In the storage holder 200, when a mobile device is inserted in the storage space 11, the mobile device contacts with the inner surface of the bottom wall portion 214 while being held by and between the support members 31 and 32. The bottom wall portion 214 is tilted such that the position of the inner surface of the bottom wall portion 214 is lowered toward the long-side side wall portion 13L2 at which the power feeding coil 50 is disposed, as described above. Therefore, when the mobile device contacts with the inner surface of the bottom wall portion 214, the mobile device moves so as to slide toward the long-side side wall portion 13L2 that has a lower surface in the bottom wall portion 214 due to the gravitational effect. In this case, the mobile device is pressed such that the end face opposing the long-side side wall portion 13L2 contacts with and along the inner surface of the long-side side wall portion 13L2.

Therefore, the storage holder 200 also allows the same effect as that of the storage holder 1 according to the first embodiment to be obtained. Furthermore, the storage holder 200 has a structure in which the bottom wall portion 214 is tilted such that the position of the inner surface of the bottom wall portion 214 of the case body 210 is lowered toward the long-side side wall portion 13L2, and allows the structure to function as the contact auxiliary unit 260. Therefore, similarly to the storage holder 100 of the second embodiment, the storage holder 200 need not have the pressing member 61, the shaft 62, and the press spring 63 of the contact auxiliary unit 60 of the storage holder 1, and the case body 210 need not have the long-side side wall openings 23, 24. Accordingly, the storage holder 200 allows a mobile device in the storage space 11 to be held in contact with and along the inner surface of the long-side side wall portion 13L2 at which the power feeding coil 50 is disposed, with a small number of components in a simple structure, and, thus, the storage holder 200 further saves a space.

In the third embodiment, the tilt structure in which the bottom wall portion 214 of the case body 210 is tilted corresponds to "first tilt structure" recited in claims.

The third embodiment is independent of the second embodiment. However, the present invention is not limited thereto. The tilt structure of the second embodiment in which the end faces 135b of the support members 131, 132 are tilted and the tilt structure of the third embodiment in which the bottom wall portion 214 of the case body 210 is tilted may be combined as the storage holder. In the structure according to the modification, a mobile device in the storage space 11 is more assuredly held in contact with and along the inner surface of the long-side side wall portion 13L2 at which the power feeding coil 50 is disposed.

Fourth Embodiment

The storage holder 1 according to the first embodiment has two arm members 33, 34, the rotary body 40, and the support spring 41, as the support mechanism 30. The support mechanism 30 assists in holding a mobile device in the storage space 11 by holding the mobile device stored in the storage space 11 from both sides in the width direction.

Figure 13:
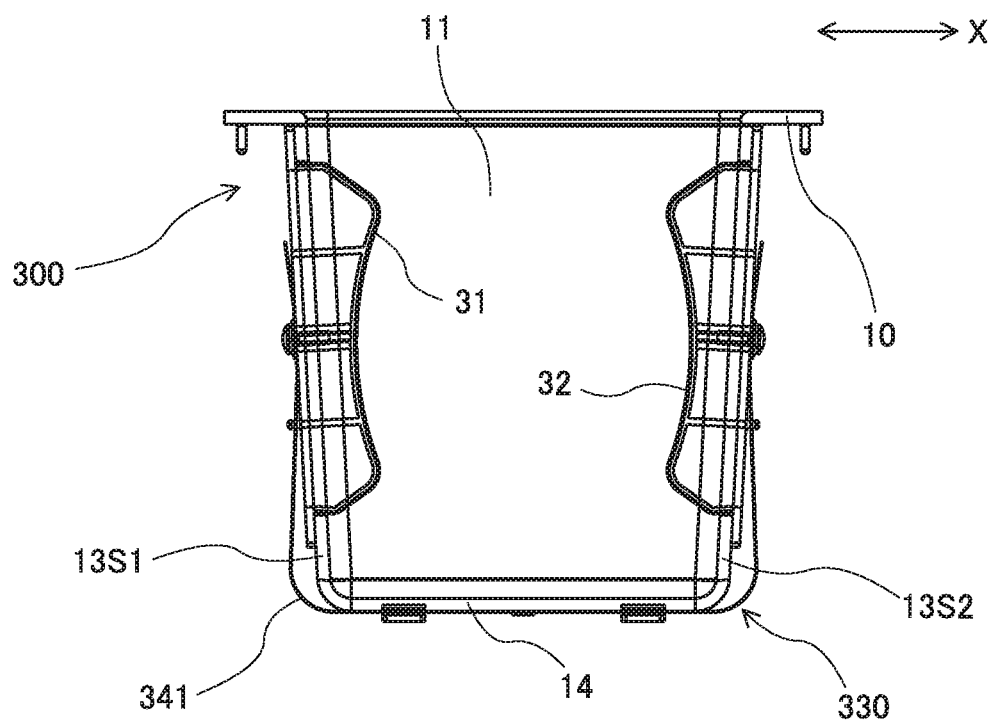
FIG. 13 is a front view of a storage holder (also illustrates a state inside a storage space) according to a fourth embodiment.
Figure 14:
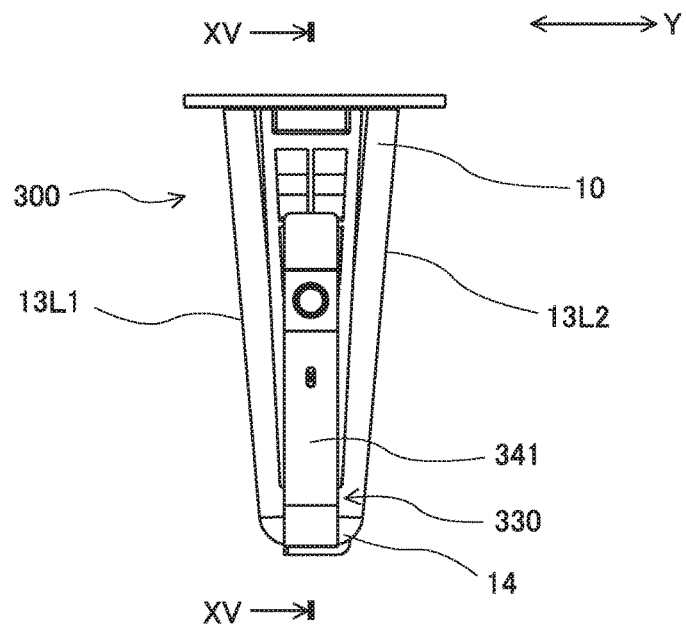
FIG. 14 is a side view of the storage holder according to the fourth embodiment.
Figure 15:
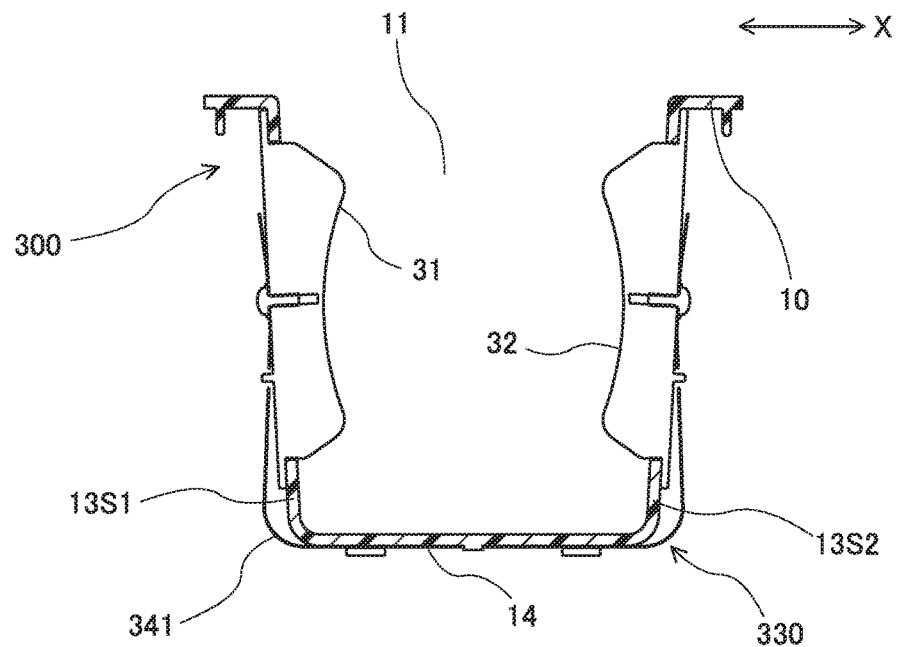
FIG. 15 is a cross-sectional view of the storage holder, as taken along a straight line XV-XV shown in FIG. 14, according to the fourth embodiment.
Figure 16:
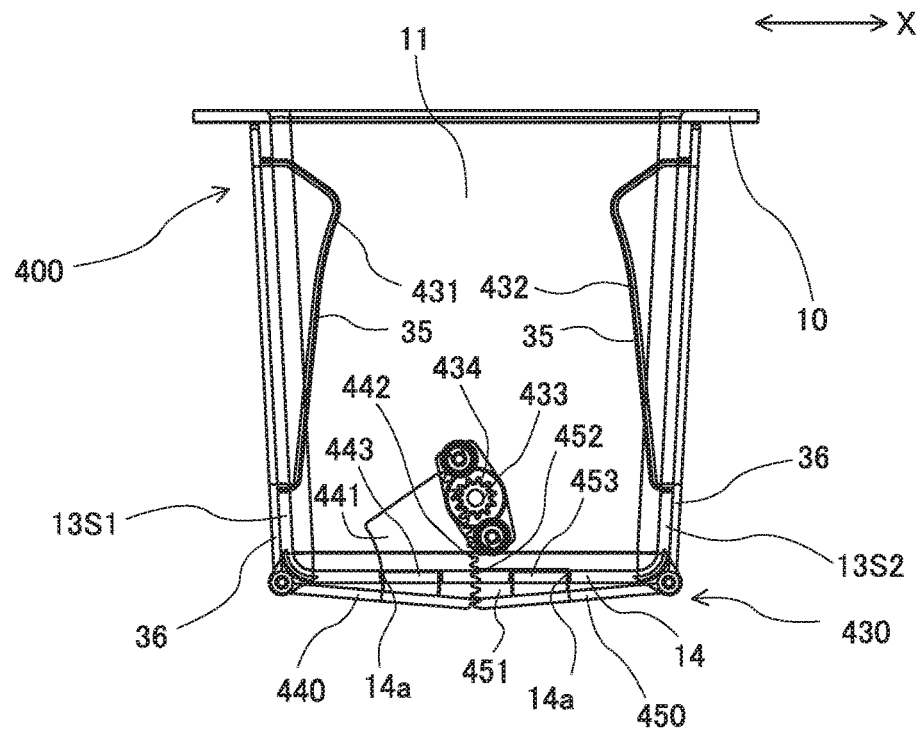
FIG. 16 is a front view of a storage holder (also illustrates a state inside a storage space) according to a fifth embodiment.
Figure 17:
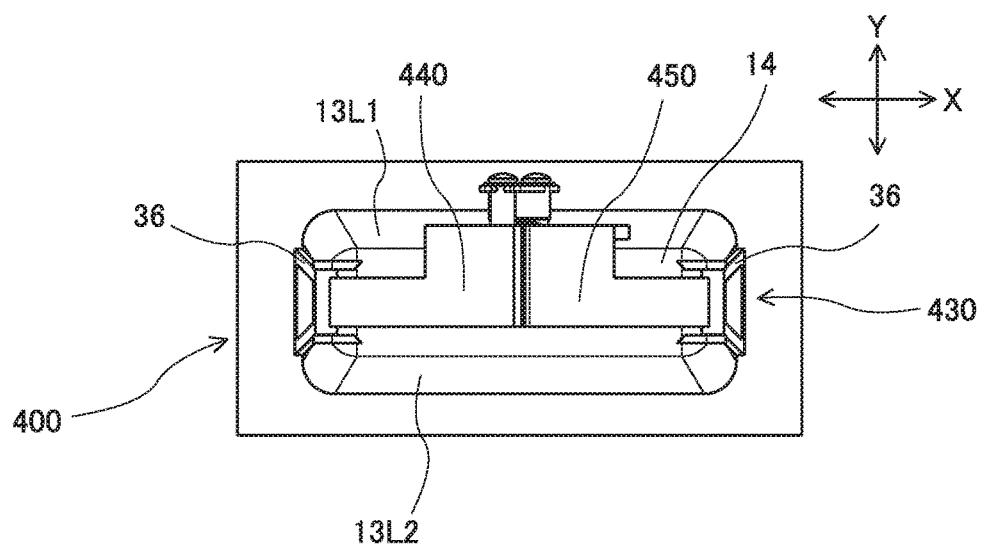
FIG. 17 is a bottom view of the storage holder according to the fifth embodiment.
Figure 18:
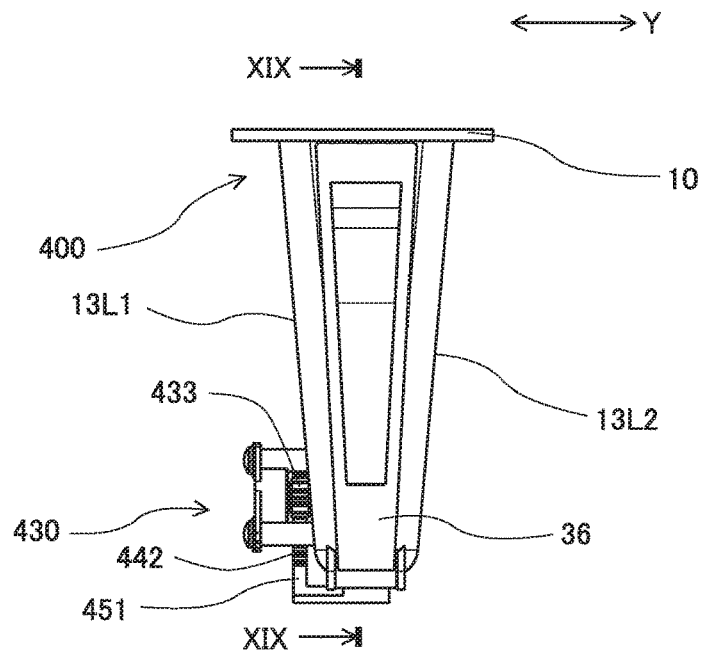
FIG. 18 is a side view of the storage holder according to the fifth embodiment.
Figure 19:
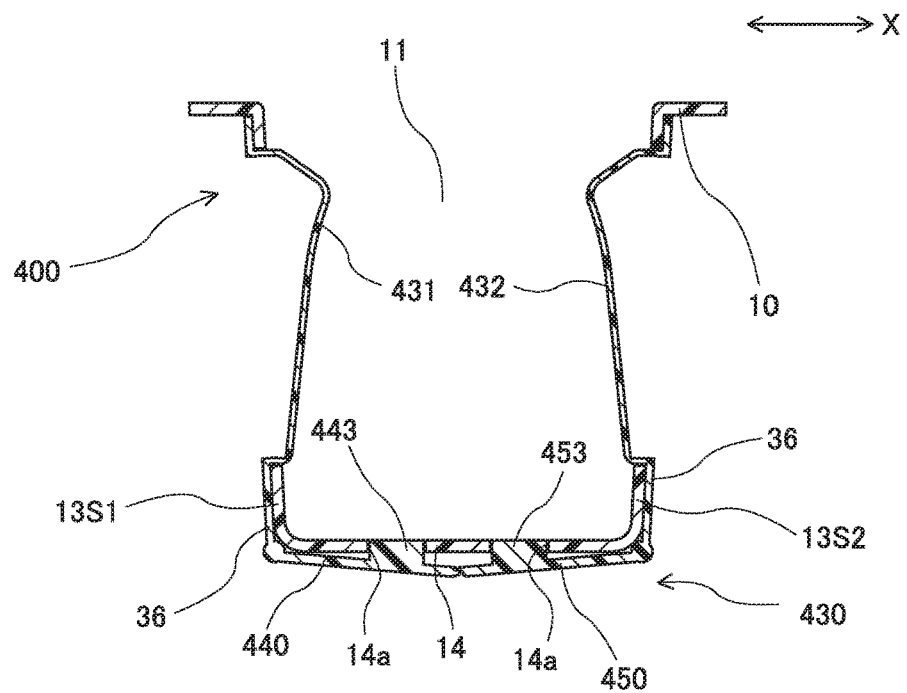
FIG. 19 is a cross-sectional view of the storage holder, as taken along a straight line XIX-XIX shown in FIG. 18, according to the fifth embodiment.

Meanwhile, a storage holder 300 according to a fourth embodiment has a plate spring as the support mechanism. The storage holder 300 has a support mechanism 330 as shown in FIG. 13 to FIG. 15. In the storage holder 300 according to the fourth embodiment, the same components as those in the storage holder 1 according to the first embodiment are denoted by the same reference numerals, and the description thereof is omitted or simplified.

The support mechanism 330 assists in holding a mobile device in the storage space 11 by holding the mobile device stored in the storage space 11 from both sides in the width direction. The support mechanism 330 has a centering function for holding the mobile device at almost the center of the storage space 11 in the direction X. The support mechanism 330 is different from the support mechanism 30 according to the first embodiment in that the support mechanism 330 does not have the two arm members 33, 34, the rotary body 40, and the support spring 41. The support mechanism 330 has two support members 31, 32 and a plate spring member 341.

The plate spring member 341 is disposed between the support member 31 and the support member 32. The plate spring member 341 is formed into a plate-like shape and a U-like shape. The plate spring member 341 is an urging member for generating a spring force in the direction X. The plate spring member 341 has one end held and fixed on the rear surface side of the support member 31. The plate spring member 341 has the other end held and fixed on the rear surface side of the support member 32. The plate spring member 341 and the support members 31, 32 are held and fixed by using screws or the like. The plate spring member 341 extends along the outer surface of the case body 10 (specifically, the outer surface of each of the short-side side wall portion 13S1, the bottom wall portion 14, and the short-side side wall portion 13S2). The plate spring member 341 is held on the outer surface side of the bottom wall portion 14 of the case body 10 so as not to be removed from the case body 10. The plate spring member 341 generates an urging force for advancing the support members 31, 32 to the above-described predetermined projection position, that is, toward the inside of the storage space 11.

In the normal state in which nothing is stored in the storage space 11, the storage holder 300 is in a state where the support members 31, 32 have advanced to the predetermined projection position at which the inward-projecting portions 35a project into the storage space 11 to the innermost side, by an urging force of the plate spring member 341. When, in this normal state, the mobile device to be held is inserted in the storage space 11, the support members 31, 32 are pressed in the direction X in which the support members 31 and 32 separate from each other against the urging force of the plate spring member 341 according to the mobile device being inserted and advanced, and slide and retract. The side surfaces of the mobile device in the width direction contact with the end faces of the inward-projecting portions 35a, and the mobile device is disposed between the two support members 31 and 32, to stop the sliding and retracting. In this case, the mobile device is held by and between the two support members 31 and 32 by the urging force of the plate spring member 341, and, thereafter, the mobile device is maintained at a position at which the mobile device is held by and between the two support members 31 and 32, and the support members 31, 32 have been retracted from the predetermined projection position.

Therefore, the storage holder 300 also allows the same effect as that of the storage holder 1 to be obtained. For example, movement of the mobile device held in the storage space 11 in the width direction in the storage space 11 is regulated due to the action of the plate spring member 341. Furthermore, both the two support members 31, 32 advance and retract according to the width of the mobile device. Therefore, the positions to which the support members 31, 32 advance and retract is changed between the predetermined projection position and the predetermined storage position according to the width of the mobile device held in the storage space 11. Therefore, the mobile device is appropriately held in the storage space 11 according to the width dimension of the mobile device.

Furthermore, in the storage holder 300, the support mechanism 330 mainly includes the plate spring member 341. Therefore, the storage holder 300 need not have the arm members 33, 34, the rotary body 40, the support spring 41, and the like of the support mechanism 30 of the storage holder 1, and the arm members 33, 34, the rotary body 40, the support spring 41, and the like need not be combined. Accordingly, the storage holder 300 allows a mobile device in the storage space 11 to be held from both sides in the width direction, with a small number of components in a simple structure, and, thus, the storage holder 300 further saves a space.

Fifth Embodiment

The storage holder 300 according to the fourth embodiment has the plate spring as the support mechanism. Meanwhile, a storage holder 400 according to a fifth embodiment has a support mechanism 430 that is different from the support mechanism 30 according to the first embodiment and the support mechanism. 330 according to the fourth embodiment, as shown in FIG. 16 to FIG. 19. In the storage holder 400 according to the fifth embodiment, the same components as those of the storage holder 1 according to the first embodiment are denoted by the same reference numerals, and the description thereof is omitted or simplified.

The support mechanism 430 assists in holding a mobile device in the storage space 11 by holding the mobile device stored in the storage space 11 from both sides in the width direction. The support mechanism 430 has a centering function for holding the mobile device at almost the center of the storage space 11 in the direction X. The support mechanism 430 does not have the two arm members 33, 34, the rotary body 40, and the support spring 41, unlike the support mechanism 30 according to the first embodiment. The support mechanism 430 has two support members 431, 432 and a rotary body 433.

The support members 431, 432 have the same functions as the support members 31, 32 according to the first embodiment. The support members 431, 432 have body portions 35, flange portions 36, and lower wall portions 440, 450. The support member 431 has the lower wall portion 440. The support member 432 has the lower wall portion 450. The lower wall portions 440, 450 are plate-like portions that are integrated with the lower ends of the flange portions 36 disposed below the body portions 35. The lower wall portions 440, 450 extend in the direction X from the lower ends of the flange portions 36 along the outer surface of the bottom wall portion 14 to the center of the bottom wall portion 14 in the direction X.

The end of the lower wall portion 440 in the direction X and the end of the lower wall portion 450 in the direction X oppose each other in the direction X. At the lower wall portion 440, a standing wall portion 441 is formed so as to extend along and parallel to the outer surface of the long-side side wall portion 13L1 that is different from the long-side side wall portion 13L2 at which the power feeding coil 50 is disposed. The end portion of the standing wall portion 441 is shaped as an arc such that that a point at which the flange portion 36 and the lower wall portion 440 connect to each other is the center of the circle to which the arc belongs. The standing wall portion 441 has a gear 442 at the end portion. At the lower wall portion 450, a standing wall portion 451 is formed so as to extend along and parallel to the outer surface of the long-side side wall portion 13L1. The end portion of the standing wall portion 451 is shaped as an arc such that a point at which the flange portion 36 and the lower wall portion 450 connect to each other is the center of the circle to which the arc belongs. The standing wall portion 451 has a gear 452 at the end portion. The gear 442 and the gear 452 mesh with each other. The lower wall portion 440 and the lower wall portion 450 are synchronously movable in the up-down direction.

Projections 443, 453 are formed on the upper surfaces of the lower wall portions 440, 450 so as to project upward. The projections 443, 453 are disposed at the end sides of the lower wall portions 440, 450 in the direction X. Projecting distances of the projections 443, 453 exceed the thickness of the bottom wall portion 14. The projections 443, 453 are exposed to the storage space 11 from through holes 14a that are opened in the bottom wall portion 14. The projections 443, 453 are moved through the through holes 14a of the bottom wall portion 14 in the up-down direction according to the movement of the lower wall portions 440, 450 in the up-down direction.

The rotary body 433 is rotatably supported by the long-side side wall portion 13L1 of the case body 10. The rotary body 433 has a damper function, specifically, has a one-way clutch damper for reducing an advancing speed at which the support members 431, 432 are returned to the inside of the storage space 11. The rotary body 433 has a gear 434 having recesses and projections formed outward in the radial direction. The gear 434 meshes with the gear 442 of the lower wall portion 440 of the support member 431. The rotary body 433 rotates to move the lower wall portion 440 of the support member 431 in the up-down direction.

In the normal state of the storage holder 400 in which nothing is stored in the storage space 11, the support members 431, 432 have advanced, by the rotary body 433, to the predetermined projection position at which the inward-projecting portions 35a project into the storage space 11 to the innermost side. When a mobile device to be held is inserted into the storage space 11 in the normal state, the support members 431, 432 are pressed by the mobile device in the direction X in which the support members 431 and 432 separate from each other, and slide and retract to a position corresponding to the width of the mobile device. The insertion progresses, and the bottom portion of the mobile device then contacts with the projections 443, 453 that project upward from the inner surface of the bottom wall portion 14 of the storage holder 400.

When the bottom portion of the mobile device presses the projections 443, 453 downward, the ends of the lower wall portions 440, 450 of the support members 431, 432 oscillate (rotate) about the points at which the ends of the lower wall portions 440, 450 connect to the flange portions 36. When the oscillation occurs, the body portions 35 of the support members 431, 432 are urged in the direction X in which the support members 431, 432 approach each other. In this case, the mobile device inserted in the storage space 11 is held in the width direction by and between the support members 431 and 432. When the bottom portion of the mobile device contacts with the inner surface of the bottom wall portion 14, the bottom wall portion 14 holds the mobile device in a state where the two support members 431, 432 hold the mobile device therebetween. Therefore, the mobile device is held in the storage space 11 of the storage holder 400. Accordingly, the storage holder 400 also allows the same effect as that of the storage holder 1 to be obtained.

In each of the fourth embodiment and the fifth embodiment, the contact auxiliary unit 160 of the second embodiment or the contact auxiliary unit 260 of the third embodiment may be used instead of the contact auxiliary unit 60 of the first embodiment.

The present invention is not limited to the above-described embodiments and modifications, and may be modified in various manners without departing from the gist of the present invention.

The present application claims priority from Japanese patent application No. 2018-185585 filed on Sep. 28, 2018, the entire content of which is hereby incorporated by reference into the present application.

The invention claimed is:

1. A storage holder comprising:
   a case body that includes a peripheral wall portion that forms a rectangular-parallelepiped-shaped storage space by two short-side side wall portions including short sides and two long-side side wall portions including long sides, a bottom wall portion that has a rectangular shape and closes a lower end of the storage space, and an opening formed in a rectangular shape for keeping an upper end of the storage space opened;
   a support mechanism that includes a first support member and a second support member, and a support urging member, the first support member and the second support member configured to advance and retract and to project into an inside of the storage space through first side wall openings formed in the two short-side side wall portions, respectively, so as to oppose each other, and the support urging member configured to urge the first support member and the second support member into the inside of the storage space;
   a power feeding coil configured to supply power in a non-contact manner to a mobile device held in the storage space, the power feeding coil being disposed outside the storage space at a first long-side side wall portion that is one of the two long-side side wall portions; and
   a contact auxiliary unit configured to assist in bringing the mobile device held in the storage space into contact with an inner surface of the first long-side side wall portion.

2. The storage holder according to claim 1, wherein the support mechanism advances and retracts the first support member and the second support member by an urging force of the support urging member in a synchronous manner.

3. The storage holder according to claim 2, wherein the support mechanism includes
   a first arm portion integrated with the first support member, the first arm portion extending toward the second support member outside the storage space at a second long-side side wall portion that is the other of the two long-side side wall portions, along the second long-side side wall portion, and the first arm portion having a first rack gear at an end portion,
   a second arm portion integrated with the second support member, the second arm portion extending toward the first support member along the second long-side side wall portion outside the storage space at the second long-side side wall portion, and the second arm portion having a second rack gear that is disposed at an end portion so as to oppose the first rack gear, and
   a rotary body disposed between the first arm portion and the second arm portion, the rotary body having a pinion gear that meshes with the first rack gear and the second rack gear.

4. The storage holder according to claim 2, wherein the support urging member is a spring member having one end fixed to the first support member or the second support member, and has the other end fixed to the case body.

5. The storage holder according to claim 2, wherein the support urging member is a plate spring member which has one end fixed to a rear surface side of the first support member and has the other end fixed to a rear surface side of the second support member.

6. The storage holder according to claim 1, wherein the contact auxiliary unit includes a pressing member configured to advance and retract and to project into the inside of the storage space through a second side wall opening formed in a second long-side side wall portion that is the other of the two long-side side wall portions, and a press urging member configured to generate an urging force for bringing the pressing member into contact with the inner surface of the first long-side side wall portion.

7. The storage holder according to claim 6, wherein the pressing member is supported on the second long-side side wall portion side of the case body so as to oscillate, and the press urging member generates an urging force for oscillating the pressing member toward the inside of the storage space.

8. The storage holder according to claim 1, wherein the contact auxiliary unit has a first tilt structure in which an inner surface of the bottom wall portion is tilted such that a position of the inner surface of the bottom wall portion is lowered toward the first long-side side wall portion.

9. The storage holder according to claim 1, wherein the contact auxiliary unit has a second tilt structure in which at least one of an end face of the first support member in an advancing-retracting direction and an end face of the second support member in an advancing-retracting direction is tilted such that a distance between the first support member and the second support member increases toward the first long-side side wall portion.

\* \* \* \* \*